United States Patent
Yamanaka et al.

(10) Patent No.: US 12,489,638 B2
(45) Date of Patent: Dec. 2, 2025

(54) DETECTION SYSTEM, DETECTION DEVICE, DETECTION METHOD, AND DETECTION PROGRAM

(71) Applicant: NTT, Inc., Tokyo (JP)

(72) Inventors: Yuki Yamanaka, Musashino (JP); Hiroyoshi Takiguchi, Musashino (JP); Masanori Shinohara, Musashino (JP); Tomohiro Nagai, Musashino (JP); Yasunori Wada, Musashino (JP)

(73) Assignee: NTT, Inc., Tokyo (JP)

( * ) Notice: Subject to any disclaimer, the term of this patent is extended or adjusted under 35 U.S.C. 154(b) by 36 days.

(21) Appl. No.: 18/716,512

(22) PCT Filed: Dec. 10, 2021

(86) PCT No.: PCT/JP2021/045499
§ 371 (c)(1),
(2) Date: Jun. 5, 2024

(87) PCT Pub. No.: WO2023/105744
PCT Pub. Date: Jun. 15, 2023

(65) Prior Publication Data
US 2025/0047494 A1    Feb. 6, 2025

(51) Int. Cl.
*H04L 9/32* (2006.01)
(52) U.S. Cl.
CPC .......... *H04L 9/3236* (2013.01); *H04L 9/3271* (2013.01)

(58) Field of Classification Search
CPC ....... H04L 9/3236; H04L 9/3271; H04L 9/32; H04W 12/106; H04W 12/122
See application file for complete search history.

(56) References Cited

U.S. PATENT DOCUMENTS 9,177,153 B1    11/2015 Perrig et al.
2017/0317889 A1*  11/2017 Moon ................... H04L 67/025

OTHER PUBLICATIONS

Yang et al., "Distributed Software-based Attestation for Node Compromise Detection in Sensor Networks", IEEE Computer Society, 26th IEEE International Symposium on Reliable Distributed Systems, 2007, pp. 219-228.

* cited by examiner

*Primary Examiner* — Izunna Okeke
(74) *Attorney, Agent, or Firm* — XSENSUS LLP

(57) ABSTRACT

A detection system includes two or more nodes and a base station that holds information on each of the nodes, wherein the base station includes first processing circuitry configured to search for a circuit passing through all nodes in a network only once, sequentially calculate as many hash values as a number of nodes in the network, and notify each node of an order in the circuit, a hash value according to the order among the calculated hash values, and a node in a subsequent stage in the circuit, and each of the nodes includes second processing circuitry configured to send a hash value notification of which is provided and a challenge to a node in a subsequent stage according to the order notification of which is provided, and verify whether or not the sent hash value matches a value calculated from the hash value notification of which is provided.

5 Claims, 7 Drawing Sheets

DETECTION SYSTEM, DETECTION DEVICE, DETECTION METHOD, AND DETECTION PROGRAM

CROSS-REFERENCE TO RELATED APPLICATION

The present application is a national stage application, pursuant to 35 U.S.C. § 371, of International Patent Application No. PCT/JP2021/045499, filed Dec. 10, 2021, the entire contents of which are incorporated herein by reference.

TECHNICAL FIELD

The present invention relates to a detection system, a detection device, a detection method, and a detection program.

BACKGROUND ART

Attestation technology for detecting system tampering has attracted attention. In the attestation technology, a digest such as a hash value or a checksum at a certain point in time when the entire storage of a monitoring target node can be regarded as normal is periodically acquired. Then, the integrity of the monitoring target node, that is, whether tampering has occurred in the node is checked by comparing the acquired digest with a digest in the current storage of the monitoring target node.

Software-based attestation technology in which all such processing is performed by software is premised that confidential information of each node can be always safely held in a reliable verification server. Therefore, when the verification server is infected, tampering cannot be correctly detected, and there are many models that fail.

Therefore, conventionally, technology in which confidential information is distributed and majority decision is performed between nodes to eliminate the need for a verification server has been disclosed (refer to Non Patent Literature 1).

CITATION LIST

Non Patent Literature

Non Patent Literature 1: Yi Yang, Xinran Wang, Sencun Zhu, and Guohong Cao, "Distributed Software-based Attestation for Node Compromise Detection in Sensor Networks", 26th IEEE International Symposium on Reliable Distributed Systems

SUMMARY OF INVENTION

Technical Problem

However, in the conventional technology, it is difficult to check the integrity of all apparatuses present in a network. For example, a large amount of communication and calculation costs have been incurred to check the integrity of all apparatuses present in a network.

The present invention has been made in view of the above, and an object thereof is to efficiently check the integrity of all apparatuses present in a network.

Solution to Problem

In order to solve the above problem and achieve the object, a detection system is a detection system including two or more nodes and a base station that holds information on each of the nodes, wherein the base station includes: first processing circuitry configured to: search for a circuit passing through all nodes in a network only once; sequentially calculate as many hash values as a number of nodes in the network; and notify each node of an order in the circuit, a hash value according to the order among the calculated hash values, and a node in a subsequent stage in the circuit, and each of the nodes includes: second processing circuitry configured to: send a hash value notification of which is provided and a challenge to a node in a subsequent stage according to the order notification of which is provided verify whether or not the sent hash value matches a value calculated from the hash value notification of which is provided through a predetermined method; return a response to the sent challenge in a case in which the hash values match; and verify the returned response.

Advantageous Effects of Invention

According to the present invention, it is possible to efficiently perform integrity check of all apparatuses present in a network.

DESCRIPTION OF EMBODIMENTS

Figure 1:
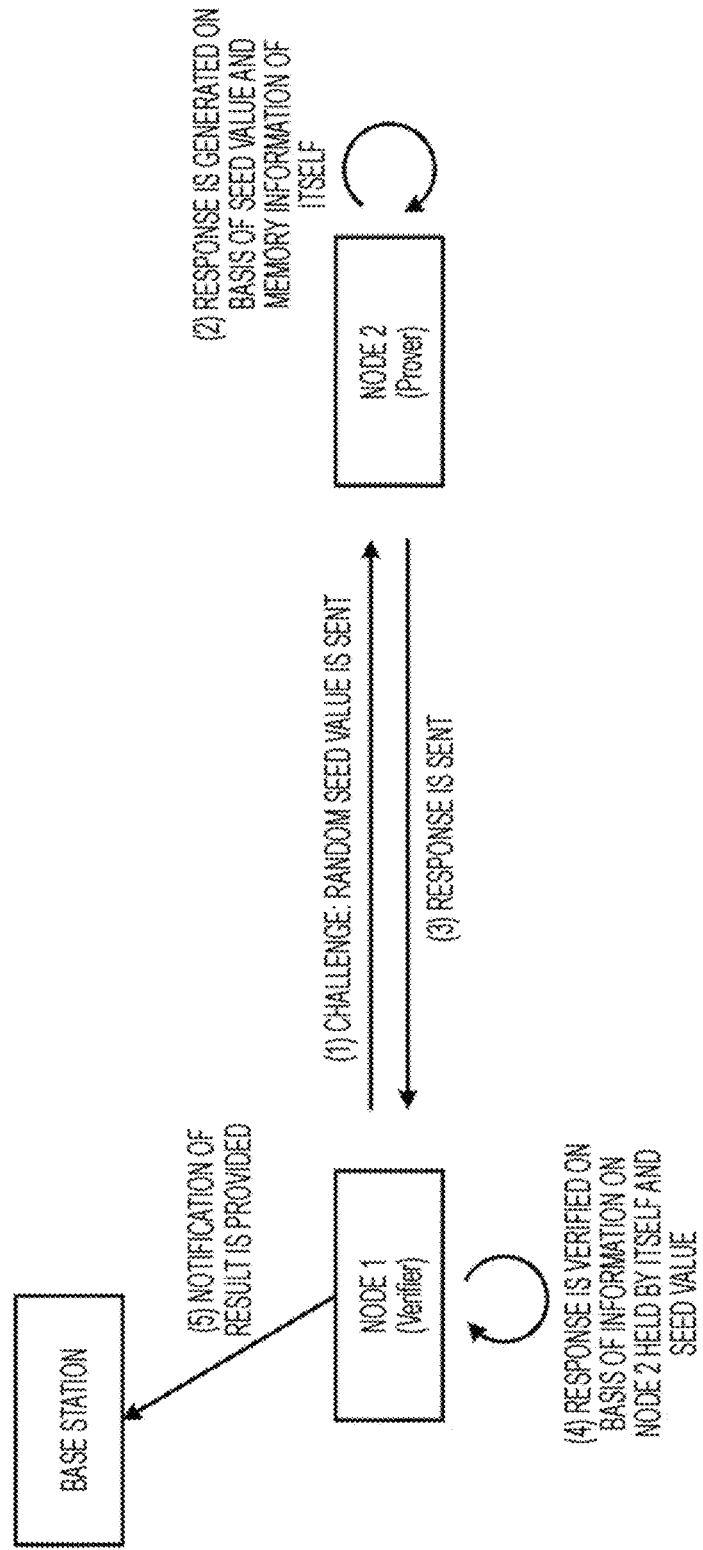
FIG. 1 is a diagram for describing an overview of a detection system.

Hereinafter, an embodiment of the present invention will be described in detail with reference to the drawings. Note that the present invention is not limited by this embodiment. In the drawings, the same parts are denoted by the same reference numerals.

Figure 2:
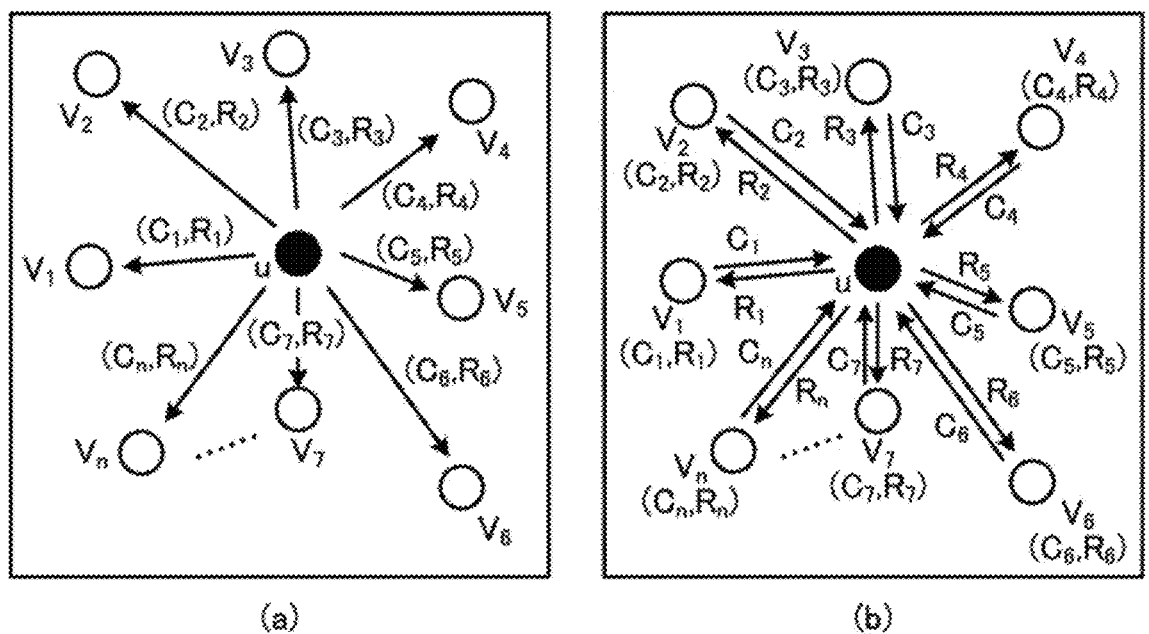
FIG. 2 is a diagram for describing an overview of a detection system.
Figure 3:
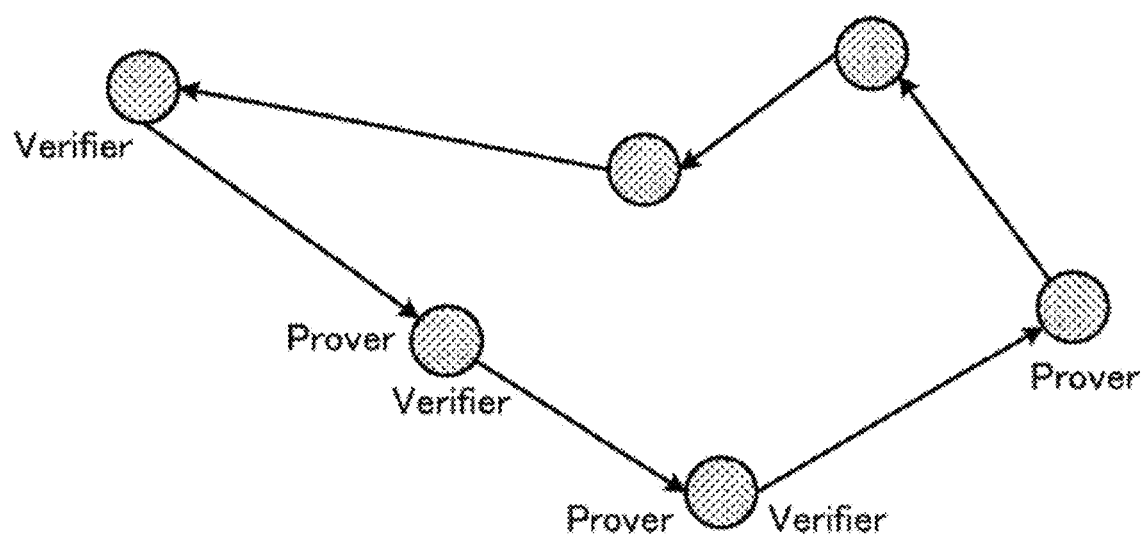
FIG. 3 is a diagram for describing an overview of a detection system.

[Overview of Detection System] FIG. 1 to FIG. 3 are diagrams for describing an overview of a detection system. First, FIG. 1 illustrates one-to-one integrity check of nodes. In one-to-one integrity check, one node is caused to function as a verifier and the other node is caused to function as a prover, and it is found without omission that tampering has occurred in information on the prover in a challenge/response procedure.

In the example illustrated in FIG. 1, the detection system includes a node 1, a node 2, and a base station, and is configured such that they can safely communicate with each other using common key encryption or the like. First, as illustrated in FIG. 1(1), the node 1 serving as a verifier sends a random value (nonce) as a challenge to the node 2 serving as a prover. At this time, the node 1 expects that a correct response is returned from the node 2 within a time limit. The node 2 sets the random value received as the challenge as a seed of a random number generator thereof.

In addition, as illustrated in FIGS. 1(2) to 1(3), the node 2 accesses a storage thereof, performs random scanning using the seed, generates a checksum or a hash digest as a response, and returns the generated checksum or hash digest to the node 1.

As illustrated in FIG. 1(4), the node 1 verifies the response. If the node 2 is infected, a correct response cannot be generated, and thus the node 1 can detect that the node 2 is infected. Then, as illustrated in FIG. 1(5), the node 1 notifies the base station of the verification result. As a result, the base station can check the integrity of the subordinate node 2.

Next, FIG. 2 illustrates integrity check among three or more nodes. In the example illustrated in FIG. 2, each node calculates a plurality of sets of a challenge sent to the node itself and a response to the challenge, and holds the sets in a memory before deployment. Then, as illustrated in FIG. 2(a), when the node is deployed in a network, the node distributes the sets of challenge/response held thereby to neighboring nodes, and deletes the distributed sets of challenge/response from the memory thereof. As a result, a neighboring node holds a challenge sent to a target node and a corresponding response, and confidential information is shared.

Then, as illustrated in FIG. 2(b), for example, a node selected as a prover using an appropriate voting algorithm receives challenges from all the neighboring nodes, calculates a responses to each of the challenges, and returns the response. Each of the neighboring nodes compares the returned response with an expected response held thereby, and in a case in which there is a discrepancy between the responses, notifies the base station that the node serving as the prover is infected.

In the example illustrated in FIG. 2, for the node serving as the prover indicated by ●, a plurality of neighboring nodes hold different sets of challenges/responses, integrity check of the node serving as the prover is performed, and presence or absence of tampering is determined by majority decision, for example. In this case, for integrity check of one node serving as a prover, communication and calculation of challenges/responses as many as the number of neighboring nodes occur.

Therefore, the detection system of the present embodiment checks whether or not there is even one infected node in a network instead of performing integrity check of one node serving as a prover. Specifically, as illustrated in FIG. 3, the detection system 1 calculates a Hamiltonian circuit, which is a circuit that goes around all nodes in a network only once, and sequentially performs one-to-one integrity check with a node in the previous stage as a verifier and a node in the subsequent stage as a prover.

In this case, all integrity checks are successful only in a case in which all nodes are normal or all nodes are infected. A case in which all the nodes are infected is considered to be rare and negligible. Therefore, the detection system can perform integrity check through one-time processing for the entire node group without performing integrity check N times for each of N nodes. As a result, it is possible to greatly reduce a communication overhead and the like, curb the number of communications and the calculation cost, and perform integrity check.

Figure 4:
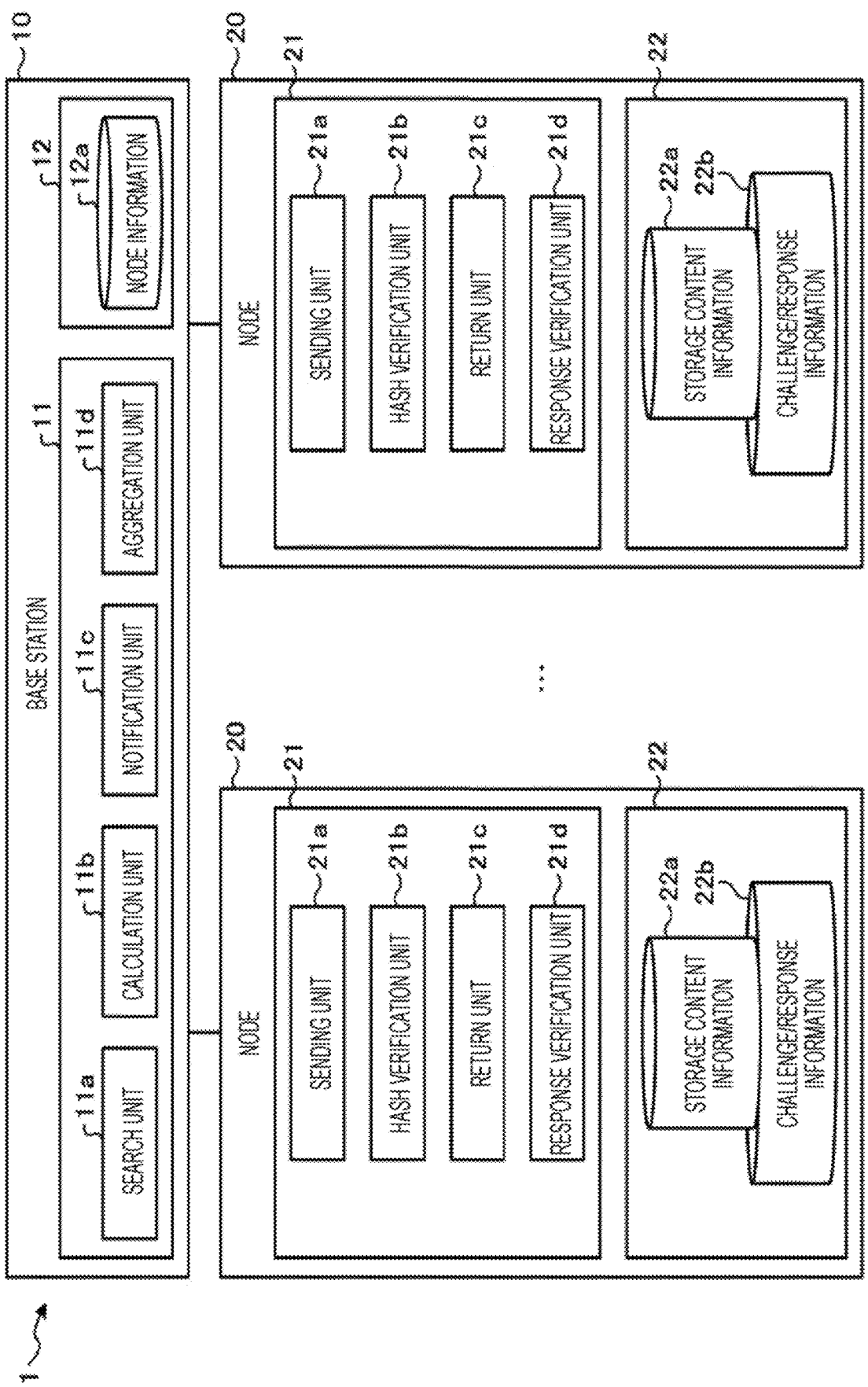
FIG. 4 is a schematic diagram illustrating a schematic configuration of the detection system.

[Configuration of Detection System] FIG. 4 is a schematic diagram illustrating a schematic configuration of the detection system. As illustrated in FIG. 4, the detection system 1 includes a base station 10 and two or more nodes 20, and is configured such that they can safely communicate with each other using common key encryption or the like.

The base station 10 holds information such as a node having a communication range to which each node 20 in a network belongs and a node having confidential information held by each node 20, and controls one-to-one integrity check between the nodes 20. That is, the base station 10 calculates a Hamiltonian circuit for the nodes 20 in the network and instructs the nodes 20 to perform one-to-one integrity check in the order of the Hamiltonian circuit. Then, each node 20 performs one-to-one integrity check as a detection device. Subsequently, the base station 10 aggregates the results of integrity checks between the nodes 20.

[Configuration of Base Station] The base station 10 is realized by a central processing unit (CPU), a network processor (NP), a field programmable gate array (FPGA), or the like, and functions as a control unit 11 by executing a processing program stored in a memory. In addition, the base station 10 includes a storage unit 12 realized by a semiconductor memory element such as a random access memory or a flash memory. Furthermore, the base station 10 includes a communication control unit which is not illustrated and communicates with the nodes 20, other network devices, and the like via the communication control unit.

In the storage unit 12, a processing program for operating the base station 10, data used during execution of the processing program, and the like are stored in advance, or temporarily stored for each processing. Note that the storage unit 12 may be configured to communicate with the control unit 11 via the communication control unit.

In the present embodiment, the storage unit 12 stores node information 12a used in detection processing which will be described later. The node information 12a includes information such as a node having a communication range to which each node in the network belongs and a node having confidential information held by each node.

The control unit 11 functions as a search unit 11a, a calculation unit 11b, a notification unit 11c, and an aggregation unit 11d as illustrated in FIG. 4 by executing the processing program stored in the memory. Note that these functional units or some thereof may be implemented in different pieces of hardware. For example, the search unit 11a and the calculation unit 11b, and the notification unit 11c and the aggregation unit 11d may be implemented in separate devices. Furthermore, the control unit 11 may include other functional units.

The search unit 11a searches for a circuit that passes through all the nodes in the network only once. Specifically, the search unit 11a calculates a Hamiltonian circuit for all the nodes in the network. The search unit 11a calculates the Hamiltonian circuit with reference to communication statuses of the node 20s of the node information 12a and a sharing status of challenges/responses which will be described later.

The detection system 1 performs one-to-one integrity check with a node 20 in the previous stage as a verifier and a node 20 in the subsequent stage as a prover to make one round in the order of the Hamiltonian circuit in detection processing which will be described later.

Here, in a case in which a challenge is sent from a normal node 20 to an infected node 20, a correct response is not generated. Therefore, success of integrity check for all the nodes 20 in one round is limited to either that all the nodes 20 are normal or that all the nodes 20 are infected. Since a case in which all the nodes 20 are infected is considered to be rare, integrity check for all the nodes 20 can be performed by the detection processing which will be described later.

The calculation unit 11b sequentially calculates as many hash values as the number N of nodes 20 in the network.

Further, the notification unit 11c notifies each node 20 of the order i in the Hamiltonian circuit, an (N−i)-th hash value corresponding to the order among the calculated hash values, and an (i+1)-th node 20 in the subsequent stage in the Hamiltonian circuit. Specifically, the notification unit 11c notifies the respective nodes 20 of the Hamiltonian circuit of the calculated hash values in descending order of the calculated orders in ascending order in the Hamiltonian circuit. That is, the notification unit 11c notifies the i-th node 20 of the Hamiltonian circuit of the (N−i)-th calculated hash value.

Figure 5:
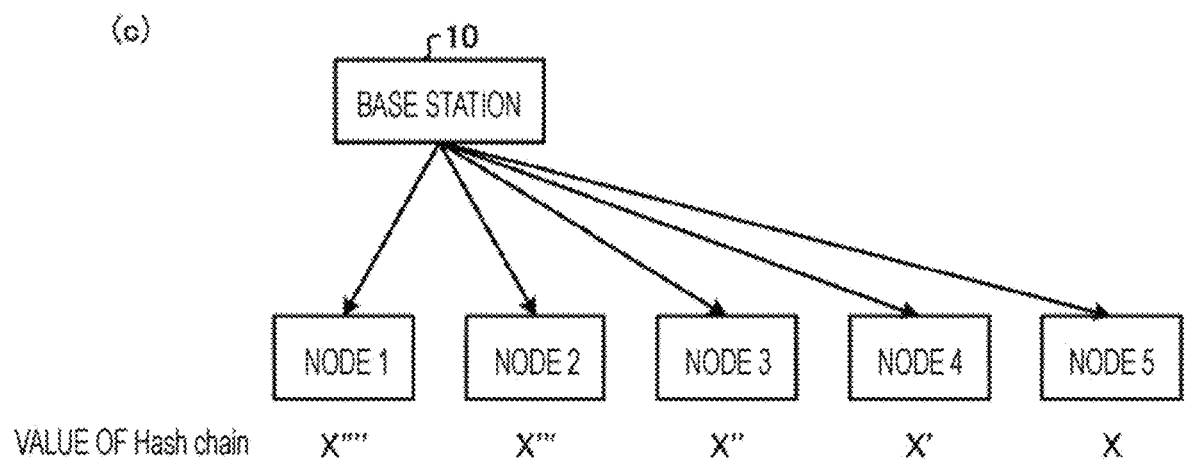
FIG. 5 is a diagram for describing processing of a base station.

Here, FIG. 5 is a diagram for describing processing of the base station. The calculation unit 11b calculates a hash value X' by applying a hash function to an initial value X. Further, a hash value X" is calculated by applying the hash function to the hash value X'. As illustrated in FIG. 5(a), the calculation unit 11b repeats this processing to generate a hash chain including as many hash values as the number of nodes 20 in the network.

Then, as illustrated in FIG. 5(b), the notification unit 11c turns over the hash chain generated by the calculation unit 11b (reverse hash chain) and rearranges the hash values in descending order of the calculated order. Then, as illustrated in FIG. 5(c), the notification unit 11c notifies the respective nodes 20 of the hash values such that the order of the Hamiltonian circuit corresponds to the order of rearrangement as illustrated in FIG. 5(b).

As a result, a hash verification unit 21b of the node 20 which will be described later can verify whether or not the node 20 in the previous stage is a node 20 expected by the base station 10 using a hash value sent from the node 20 in the previous stage and a hash value notification of which is provided by itself. For example, in a case in which a hash value (for example, X") sent from the node 20 in the previous stage matches a hash value (X") calculated by applying the hash function to the hash value (for example, X') notification of which is provided by the hash verification unit 12b, the hash verification unit 12b can confirm that the node in the previous stage is the expected node 20.

The description returns to FIG. 4. The aggregation unit 11d aggregates results of verification of the hash verification unit 21b or a response verification unit 21d of the node 20 which will be described later. As a result, the base station 10 can aggregate verification results which will be described later in each node 20. For example, in a case in which the verification results of the nodes 20 include any abnormal result different from an expected value, the aggregation unit 11d issues an alert on the assumption that there is an infected node 20 in the network.

[Configuration of Node] The node 20 is realized by a CPU, an NP, an FPGA, or the like, and functions as the control unit 21 by executing a processing program stored in the memory. Further, the node 20 includes a storage unit 22 realized by a semiconductor memory element such as a RAM or a flash memory. Further, the node 20 includes a communication control unit which is not illustrated, and communicates with the base station 10, other network devices, and the like via the communication control unit.

In the storage unit 22, a processing program for operating the node 20, data used during execution of the processing program, and the like are stored in advance, or temporarily stored for each processing. Note that the storage unit 22 may be configured to communicate with the control unit 21 via the communication control unit.

In the present embodiment, the storage unit 22 stores storage content information 22a, challenge/response information 22b, and the like. The storage content information 22a is referred to when a return unit 21c generates a response to a challenge sent from the node 20 in the previous stage in detection processing which will be described later.

In addition, the challenge/response information 22b is a combination of a challenge sent to each node in the network and a normal response to the challenge. As described above, the node 20 calculates a plurality of challenges to be sent thereto and responses to the challenges in advance before being deployed.

Then, when the node 20 is deployed in the network, the node distributes a set of challenges/responses held thereby to neighboring nodes 20 and deletes the distributed set of challenges/responses from the memory thereof. As a result, each of the neighboring nodes 20 holds the challenge/response information 22b as a response corresponding to a challenge sent to a node serving as a prover. Accordingly, each node in the network shares confidential information.

The control unit 21 functions as a sending unit 21a, the hash verification unit 21b, the return unit 21c, and the response verification unit 21d as illustrated in FIG. 4 by executing the processing program stored in the memory. In addition, the control unit 11 may also include other functional units.

The sending unit 21a sends a hash value notification of which is provided and challenge to the node 20 in the subsequent stage according to the order i notification of which is provided from the notification unit 11c. Specifically, the sending unit 21a of the i-th node 20 sends the (N−i)-th hash value notification of which is provided from the notification unit 11c and a challenge for the (i+1)-th node 20 to the (i+1)-th node 20.

The sending unit 21a sends, to the (i+1)-th node in the subsequent stage, a challenge corresponding to the (i+1)-th node in the subsequent stage as a challenge with reference to the challenge/response information 22b in the storage unit 22

The hash verification unit 21b verifies whether or not the hash value sent from the i-th node 20 in the previous stage matches a value calculated from the hash value notification of which is provided using a predetermined method. Specifically, the hash verification unit 21b verifies whether or not the hash value sent from the i-th node 20 in the previous stage matches a hash value calculated from the hash value notification of which is provided.

For example, the hash verification unit 21b of the (i+1)-th node 20 verifies whether or not the (N−i)-th hash value sent from the i-th node 20 in the previous stage matches a hash value obtained by applying a hash function to the (N−(i+1))-th hash value notification of which is provided thereby. In a case in which they match, it can be confirmed that the node 20 in the previous stage is the i-th node 20 expected by the base station 10.

Therefore, in a case in which they match, the hash verification unit 21b shifts processing to the return unit 12c which will be described below. In addition, in a case in which they do not match, the hash verification unit 21b may notify the aggregation unit 11d of the base station 10 of the verification result, for example.

In a case in which the hash values match in the hash verification unit 21b, the return unit 21c returns a response to the sent challenge. Specifically, the return unit 21c takes out a nonce included in the challenge and sets the nonce as a seed. Then, the return unit 12c generates a response with reference to the storage content information 22a and returns the response to the node 20 in the previous stage.

The response verification unit 21d verifies the returned response. Specifically, the response verification unit 21d verifies whether or not the returned response matches a normal response with reference to the challenge/response information 22b in the storage unit 22. The response verification unit 21d determines that the node 20 in the subsequent stage is normal in a case in which the responses match and determines that the node 20 in the subsequent stage is infected in a case in which the responses do not match.

In addition, the response verification unit 21d notifies the aggregation unit 11d of the base station 10 of the verification result. As a result, as described above, the base station 10 can aggregate the results of response verification in the respective nodes 20. For example, in a case in which any one of the results of response verification of the respective nodes 20 includes a determination result indicating that the node 20 in the subsequent stage is infected, the aggregation unit 11d issues an alert on the assumption that the infected node 20 is present in the network.

Note that, even in a case in which the hash verification unit 21b has provided notification of the verification result, the aggregation unit 11d issues an alert on the assumption that processing regardless of the order of the Hamiltonian circuit expected by the base station 10 has been executed.

Figure 6:
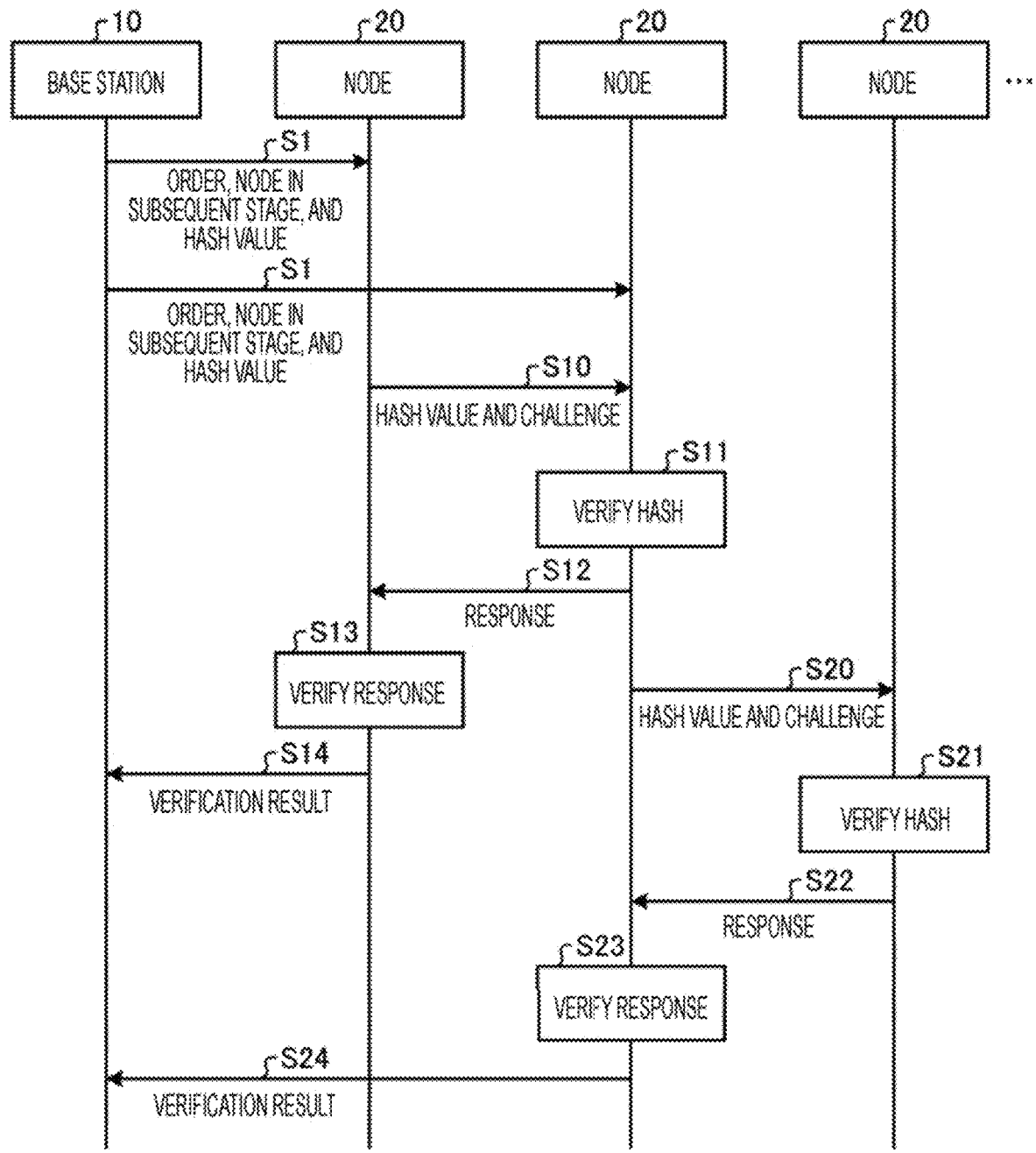
FIG. 6 is a sequence diagram illustrating a detection processing procedure.

[Detection Processing] Next, detection processing performed by the detection system 1 according to the present embodiment will be described with reference to FIG. 6. FIG. 6 is a sequence diagram illustrating a detection processing procedure. The sequence of FIG. 6 is started, for example, at a timing when an operation input instructing the start of the detection processing is applied.

First, the notification unit 11c of the base station 10 notifies each node 20 of an order i in a Hamiltonian circuit, an (N−i)-th hash value according to the order among calculated hash values, and an (i+1)-th node 20 in the subsequent stage in the Hamiltonian circuit (step S1).

First, in the first node 20, the sending unit 21a sends the (N−1)-th hash value notification of which is provided from the notification unit 11c and a challenge for the second node 20 to the second node 20 (step S10).

Specifically, the sending unit 21a sends, to the second node in the subsequent stage, a challenge corresponding to the second node as a challenge with reference to the challenge/response information 22b in the storage unit 22.

The hash verification unit 21b of the second node 20 verifies whether or not the (N−1)-th hash value sent from the first node 20 in the previous stage matches a hash value obtained by applying a hash function to an (N−2)-th hash value notification of which is provided thereby (step S11).

In a case in which the hash values match in the hash verification unit 21b, the return unit 21c of the second node 20 returns a response to the sent challenge (step S12). Specifically, the return unit 21c takes out a nonce included in the challenge and sets the nonce as a seed. Then, the return unit 21c generates a response with reference to the storage content information 22a and returns the response to the first node 20.

The response verification unit 21d of the first node 20 verifies the returned response (step S13). Specifically, the response verification unit 21d verifies whether or not the returned response matches a normal response with reference to the challenge/response information 22b in the storage unit 22. The response verification unit 21d determines that the second node 20 is normal in a case in which the responses match and determines that the second node 20 is infected in a case in which the responses do not match.

In addition, the response verification unit 21d notifies the aggregation unit 11d of the base station 10 of the verification result (step S14).

Similarly, in the second node 20, the sending unit 21a sends the (N−2)-th hash value notification of which is provided from the notification unit 11c and a challenge for the third node 20 to the third node 20 (step S20).

The hash verification unit 21b of the third node 20 verifies whether or not the (N−2)-th hash value sent from the second node 20 in the previous stage matches a hash value obtained by applying the hash function to an (N−3)-th hash value notification of which is provided thereby (step S21).

In a case in which the hash values match in the hash verification unit 21b, the return unit 21c of the third node 20 returns a response to the sent challenge (step S22).

The response verification unit 21d of the second node 20 verifies whether or not the returned response matches a normal response (step S23). The response verification unit 21d determines that the third node 20 is normal in a case in which the responses match and determines that the third node 20 is infected in a case in which the responses do not match.

In addition, the response verification unit 21d notifies the aggregation unit 11d of the base station 10 of the verification result (step S24).

Similarly, in the i-th node 20, the sending unit 21a sends the (N−i)-th hash value notification of which is provided from the notification unit 11c and a challenge for the (i+1)-th node 20 to the (i+1)-th node 20.

Specifically, the sending unit 21a sends, to the (i+1)-th node in the subsequent stage, a challenge corresponding to the (i+1)-th node in the subsequent stage as a challenge with reference to the challenge/response information 22b in the storage unit 22.

The hash verification unit 21b of the (i+1)-th node 20 verifies whether or not the (N−i)-th hash value sent from the i-th node 20 in the previous stage matches a hash value obtained by applying the hash function to the (N−(i+1))-th hash value notification of which is provided thereby.

In a case in which the hash values match in the hash verification unit 21b, the return unit 21c of the (i+1)-th node 20 returns a response to the sent challenge.

The response verification unit 21d verifies whether or not the returned response matches a normal response with reference to the challenge/response information 22b in the storage unit 22. The response verification unit 21d determines that the node 20 in the subsequent stage is normal in a case in which the responses match and determines that the node 20 in the subsequent stage is infected in a case in which the responses do not match. In addition, the response verification unit 21d notifies the aggregation unit 11d of the base station 10 of the verification result.

The detection system 1 repeats the same processing as described above until processing between the N-th node 20 and the first node 20 is reached.

Then, in a case in which any one of results of response verification of the respective nodes 20 includes a determination result indicating that the node 20 in the subsequent stage is infected, the aggregation unit 11d issues an alert on the assumption that the infected node 20 is present in the network, for example. As a result, a series of detection processing ends.

[Effects] As described above, in the detection system 1, the search unit 11a in the base station 10 searches for a circuit that passes through all nodes in a network only once. The calculation unit 11b sequentially calculates as many hash values as the number of nodes in the network. In addition, the notification unit 11c notifies each node of the order in the circuit, a hash value according to the order among the calculated hash values, and a node in the subsequent stage in the circuit. In the node 20, the sending unit 21a sends a notified hash value and a challenge to a node in the subsequent stage according to the order notification of which is provided from the notification unit 11c. In addition, the hash verification unit 21b verifies whether or not the hash value sent from the node in the previous stage matches a value calculated from the hash value notification of which is provided using a predetermined method. In addition, in a case in which the hash values match, the return unit 21c returns a response to the sent challenge. In addition, the response verification unit 21d verifies the returned response.

As a result, the detection system 1 can perform integrity check through one-time processing for the entire node group. As a result, it is possible to greatly reduce a communication overhead and the like, curb the number of communications and the calculation cost, and perform integrity check. As described above, it is possible to efficiently perform integrity check for all apparatuses present in a network without requiring a verification server that can safely hold confidential information of each node.

In addition, the storage unit 22 of the node 20 stores a combination of a challenge sent to each node in the network and a normal response to the challenge. In this case, the sending unit 21a sends a challenge corresponding to the node in the subsequent stage as a challenge to the node in the subsequent stage with reference to the storage unit 22. Further, the response verification unit 21d verifies whether or not the returned response matches a normal response with reference to the storage unit 22. As a result, the node 20 serving as a detection device does not need a verification server that can safely hold confidential information of each node, and thus it is possible to perform integrity check for all nodes 20 present in the network with high accuracy and efficiency.

In addition, the notification unit 11c notifies each node of the circuit of a calculated hash value in descending order of the calculated orders in ascending order in the circuit. In this case, the hash verification unit 21b verifies whether or not the sent hash value matches the hash value calculated from the hash value notification of which is provided. As a result, it is possible to efficiently perform integrity check for the node 20 according to a predetermined circuit.

In addition, in the base station 10, the aggregation unit 11d aggregates the results of verification of the hash verification unit 21b or the response verification unit 21d. As a result, it is possible to determine that even one of nodes 20 in subsequent stages is infected. Therefore, the detection system 1 can easily check whether or not an infected node 20 is present in the network.

[Program] It is also possible to create a program in which processing executed by the detection system 1 according to the above-described embodiment has been written in a language executable by a computer. As an embodiment, the base station 10 and the node 20 can be implemented by installing a detection program for executing the above detection processing as package software or online software in a desired computer. For example, an information processing device can be caused to function as the base station 10 and the node 20 by causing the information processing device to execute the detection program described above. In addition, the information processing device includes mobile communication terminals such as a smartphone, a mobile phone, and a personal handyphone system (PHS), and further includes a slate terminal such as a personal digital assistant (PDA). Further, the functions of the base station 10 and the node 20 may be implemented in a cloud server.

Figure 7:
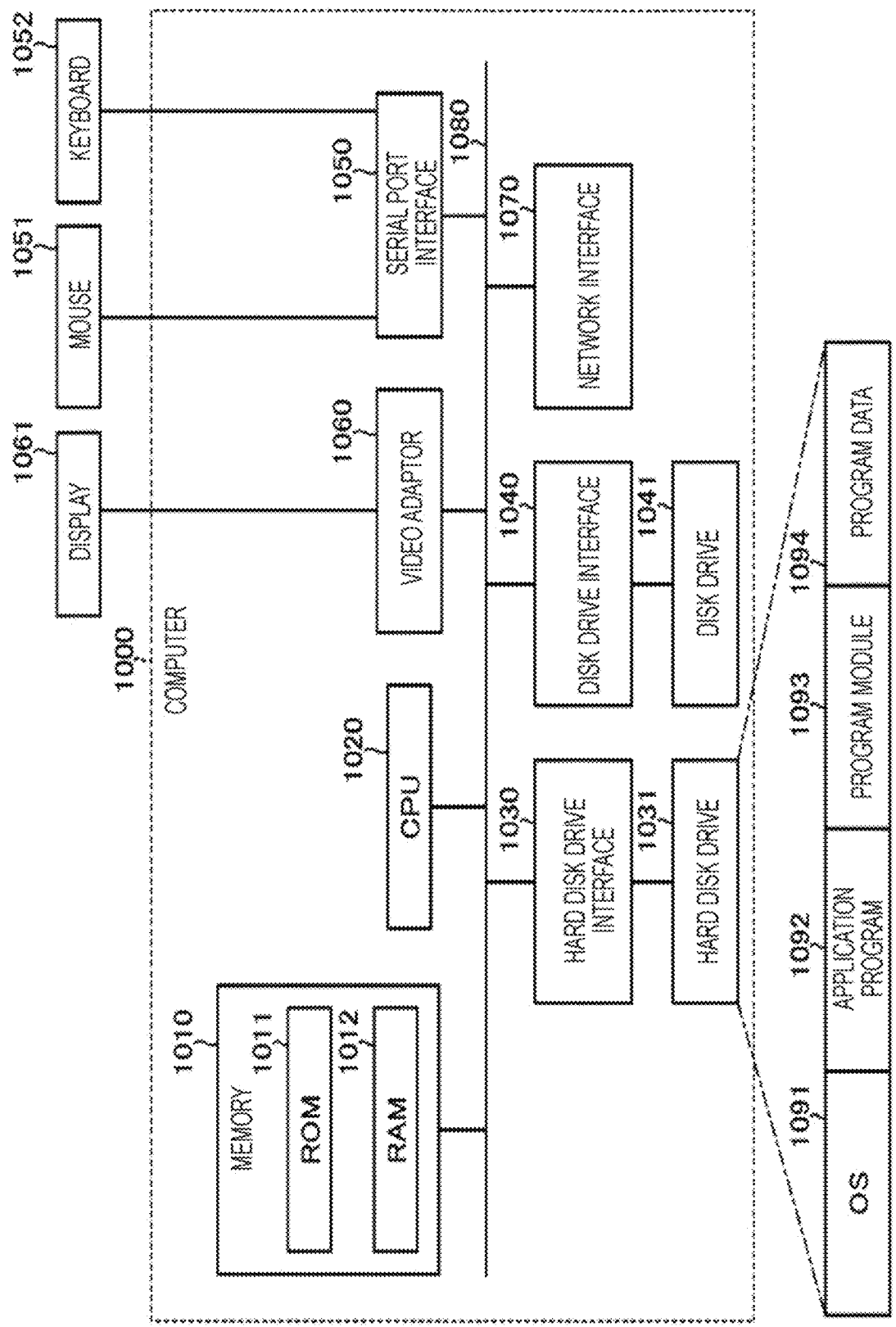
FIG. 7 is a diagram illustrating a computer that executes a detection program.

FIG. 7 is a diagram illustrating an example of a computer that executes the detection program. A computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a removable storage medium such as a magnetic disk or an optical disc is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. Each piece of information described in the above embodiment is stored in, for example, the hard disk drive 1031 or the memory 1010.

In addition, the detection program is stored in the hard disk drive 1031 as the program module 1093 in which commands executed by the computer 1000 have been written, for example. Specifically, the program module 1093 in which each type of processing executed by the base station 10 and the node 20 described in the above embodiment has been written is stored in the hard disk drive 1031.

In addition, data used for information processing performed by the detection program is stored, for example, in the hard disk drive 1031 as the program data 1094. Then, the CPU 1020 reads the program module 1093 and the program data 1094 stored in the hard disk drive 1031 to the RAM 1012 as necessary, and executes each procedure described above.

Note that the program module 1093 and the program data 1094 related to the detection program are not limited to being stored in the hard disk drive 1031, and may be stored in, for example, a removable storage medium and read by the CPU 1020 via the disk drive 1041 or the like. Alternatively, the program module 1093 and the program data 1094 related to the detection program may be stored in another computer connected via a network such as a local area network (LAN) or a wide area network (WAN) and read by the CPU 1020 via the network interface 1070.

Although the embodiments to which the invention made by the present inventors is applied have been described above, the present invention is not limited by the description and drawings constituting a part of the disclosure of the present invention according to the present embodiments. That is, other embodiments, examples, operation techniques, and the like made by those skilled in the art on the basis of the present embodiment are all included in the scope of the present invention.

REFERENCE SIGNS LIST

1 Detection system
10 Base station
11, 21 Control unit
11a Search unit
11b Calculation unit
11c Notification unit
11d Aggregation unit
12, 22 Storage unit
12a Node information 20 Node (detection device)
21a Sending unit
21b Hash verification unit
21c Return unit
21d Response verification unit
22a Storage content information
22b Challenge/response information

The invention claimed is:

1. A detection system, comprising:
two or more nodes; and
a base station that holds information on each of the nodes, the base station including first processing circuitry configured to:
   search for a circuit passing through all nodes in a network only once;
   sequentially calculate as many hash values as a number of nodes in the network; and
   notify each node of an order in the circuit, a hash value according to the order among the calculated hash values, and a node in a subsequent stage in the circuit, wherein
each of the nodes includes second processing circuitry configured to:
   send a hash value notification of which is provided and a challenge to a node in a subsequent stage according to the order notification of which is provided;
   verify whether or not the sent hash value matches a value calculated from the hash value notification of which is provided through a predetermined method;
   return a response to the sent challenge in a case in which the hash values match;
   verify the returned response;
   store a combination of a challenge sent to each node in the network and a normal response to the challenge in a storage;
   send, to the node in the subsequent stage, a challenge corresponding to the node in the subsequent stage as the challenge with reference to the storage; and
   verify whether or not the returned response matches a normal response with reference to the storage.

2. The detection system according to claim 1, wherein
the first processing circuitry is further configured to notify each node of the circuit of the calculated hash value in descending order of the calculated hash values in ascending order of the circuit, and
the second processing circuitry is further configured to verify whether or not the sent hash value matches a hash value calculated from the hash value notification of which is provided.

3. The detection system according to claim 1, wherein the first processing circuitry is further configured to aggregate results of verification.

4. A detection method executed by a detection system including two or more nodes and a base station that holds information on each of the nodes, the detection method comprising:
   searching for a circuit passing through all nodes in a network only once;
   sequentially calculating as many hash values as a number of nodes in the network;
   notifying each node of an order in the circuit, a hash value according to the order among the calculated hash values, and a node in a subsequent stage in the circuit;
   sending a hash value notification of which is provided and a challenge to a node in a subsequent stage according to the order notification of which is provided;
   verifying whether or not the sent hash value matches a value calculated from the hash value notification of which is provided through a predetermined method;
   returning a response to the sent challenge in a case in which the hash values match;
   verifying the returned response;
   storing a combination of a challenge sent to each node in the network and a normal response to the challenge in a storage;
   sending, to the node in the subsequent stage, a challenge corresponding to the node in the subsequent stage as the challenge with reference to the storage; and
   verifying whether or not the returned response matches a normal response with reference to the storage.

5. A non-transitory computer-readable recording medium storing therein a detection program that causes a computer to execute a process comprising:
   searching for a circuit passing through all nodes in a network only once;
   sequentially calculating as many hash values as a number of nodes in the network;
   notifying each node of an order in the circuit, a hash value according to the order among the calculated hash values, and a node in a subsequent stage in the circuit;
   sending a hash value notification of which is provided and a challenge to a node in a subsequent stage according to the order notification of which is provided;
   verifying whether or not the sent hash value matches a value calculated from the hash value notification of which is provided through a predetermined method;
   returning a response to the sent challenge in a case in which the hash values match;
   verifying the returned response;
   storing a combination of a challenge sent to each node in the network and a normal response to the challenge in a storage;
   sending, to the node in the subsequent stage, a challenge corresponding to the node in the subsequent stage as the challenge with reference to the storage; and
   verifying whether or not the returned response matches a normal response with reference to the storage.

* * * * *